US010162893B2

(12) United States Patent
Kenna, III et al.

(10) Patent No.: US 10,162,893 B2
(45) Date of Patent: Dec. 25, 2018

(54) CONFIGURABLE ELECTRONIC MEDIA DISTRIBUTION SYSTEM

(71) Applicant: The Marlin Company, Wallingford, CT (US)

(72) Inventors: Frank Kenna, III, Branford, CT (US); Preeti Patel, Norwalk, CT (US)

(73) Assignee: THE MARLIN COMPANY, Wallingford, CT (US)

( * ) Notice: Subject to any disclaimer, the term of this patent is extended or adjusted under 35 U.S.C. 154(b) by 297 days.

(21) Appl. No.: 13/772,084

(22) Filed: Feb. 20, 2013

(65) Prior Publication Data
US 2014/0236975 A1 Aug. 21, 2014

(51) Int. Cl.
G06F 17/30 (2006.01)

(52) U.S. Cl.
CPC .... *G06F 17/30864* (2013.01); *G06F 17/3089* (2013.01)

(58) Field of Classification Search
CPC combination set(s) only.
See application file for complete search history.

(56) References Cited

U.S. PATENT DOCUMENTS

| | | | |
|---|---|---|---|
| 7,676,418 B1 * | 3/2010 | Chung | G06Q 10/06393 705/36 R |
| 7,743,112 B2 | 6/2010 | Kenna, III et al. | |
| 7,765,273 B2 | 7/2010 | Kenna, III et al. | |
| 7,877,774 B1 * | 1/2011 | Basso | G06F 17/3002 725/115 |
| 2005/0165742 A1 * | 7/2005 | Chin | G06F 17/30991 |
| 2007/0038696 A1 * | 2/2007 | Kenna et al. | 709/201 |
| 2008/0111763 A1 * | 5/2008 | Gatley et al. | 345/1.1 |
| 2008/0119132 A1 * | 5/2008 | Rao | 455/3.04 |
| 2008/0215515 A1 * | 9/2008 | Rodenburg | 706/45 |
| 2009/0070835 A1 * | 3/2009 | Bontempi | 725/92 |
| 2009/0106671 A1 * | 4/2009 | Olson et al. | 715/757 |
| 2010/0325675 A1 * | 12/2010 | Smoyer et al. | 725/97 |
| 2011/0173214 A1 * | 7/2011 | Karim | 707/754 |
| 2011/0246440 A1 * | 10/2011 | Kocks | G06F 17/30781 707/706 |

FOREIGN PATENT DOCUMENTS

WO WO 2008053168 A1 * 5/2008 ......... H04N 7/17318
WO WO 2010135101 A2 * 11/2010

* cited by examiner

*Primary Examiner* — Augustine K. Obisesan
(74) *Attorney, Agent, or Firm* — Cantor Colburn LLP (57) ABSTRACT

A method and system for the distribution of electronic media content to employees where the subscriber is presented with a media content library that is key word searchable such that the subscriber can quickly and easily identify media content associated with certain key words. The subscriber's key word searches may also be saved and the subscriber notified when additional media content is available associated with the previously searched key word.

21 Claims, 7 Drawing Sheets

FIG. 7

CONFIGURABLE ELECTRONIC MEDIA DISTRIBUTION SYSTEM

FIELD OF THE INVENTION

The present invention relates generally to a system for publishing and distributing employee communications and more particularly to a system that allows a user to search a database of content addressing specific workplace topics that can be quickly and easily be presented on an employee communication system.

BACKGROUND OF THE INVENTION

Effective communications between management and employees is important for modern business management. Use of a bulletin board upon which printed material, such as, posters including photographs, artwork, designs and/or slogans, and messages are displayed have been used in the past.

In recent years, systems for presenting electronic communications have been developed that provide significant advantages over known paper systems. For example, U.S. Pat. Nos. 7,765,273 and 7,743,112 both describe a system and method for the distribution of electronic media. These systems provided significant improvements over known communication systems allowing a user to present electronic communications to employees by assembling a media kit of information and assigning the various media data to be presented at various times. Additionally, these systems allowed a user to select pre-assembled media content generated and provided by the service provider to the subscriber for selection and inclusion in the user's media kit. However, media content the user could select was limited, therefore, it was rather easy for a user to simply scroll through the various pre-assembled content to select the content that the user wanted to use and/or modify for use.

A challenge the users of the system face is that of providing "fresh" or new content to their employees in order to keep their employees attention month after month. While the provision to allow a user to generate content is a nice feature, as is the ability to allow a user to modify pre-assembled content, this can be a rather time-consuming job that needs to be done on a continuous basis. Accordingly, the need for new pre-assembled media content has become more and more important. Likewise, the ability to quickly and easily find particular content has been a challenge as relatively large quantities of media content continue to be added to the system.

It is also important to be able to see how the media content would look on a display screen prior to setting up a media kit to run at a customer's location. The ability to quickly locate content, load that content into a virtual screen so as to view how the content would look when presented would be very desirable.

Accordingly, it is desired to provide a system that allows a user to quickly and easily locate pre-assembled media content for presentation on a user's communication system and add that located content to the user's media kit.

It is also desired to provide a system that allows a user to visually see how the media content will look prior to the pre-assembled media content being added to the user's media kit and displayed at the user's location.

SUMMARY OF THE INVENTION

These and other objects are achieved in one advantageous embodiment by the presentation of a media library feature that allows a user to search and download content to add to the user media kit.

The media library enables users to quickly and easily search by keyword for content addressing specific workplace topics. The content can then be uploaded to virtual Frames (A or B) on the user's computer screen so that the user can preview how the content would appear on the user's display prior to actually presenting the data on their own equipment.

One advantageous embodiment may include an electronic communication system (ECS) that includes a controller and a display located at a customer location. A user has access to a service provider computer/server to access the system by means of a web page. The user is able to log on to the web page and view a media kit that comprises the electronic communications the user has selected to be transmitted to the controller and ultimately presented on the user's display(s).

It is envisioned that the provider may design and store certain electronic employee communications suitable for a variety of business types, e.g., manufacturing, sales, service, etc. The electronic employee communications may be provided to businesses as, for example, a subscription service. In one embodiment, the user/subscriber may provide information about their business to the provider to aid the provider's software in selecting and presenting pertinent electronic employee communications. The user/subscriber may be granted access to the provider's server to enable the user/subscriber to choose, alter and/or generate new custom electronic employee communications, which are to be delivered to the subscriber's electronic display.

In one advantageous embodiment, a system is provided that allows for selection of pre-assembled media content. It is contemplated that the subscriber may categorize particular media content into collections, e.g. certain media content is selected to be displayed for maintenance personnel while other selected media content may be selected to be displayed for management personnel. It is still further contemplated that the various collections may be linked to certain groups, e.g. it is determined that while the various maintenance personnel at the subscribers various complexes may not be presented with an identical presentation, there are particular media collections that will be displayed at all maintenance displays.

The media library may comprise a database of employee communications that are indexed by key word. For example, the user may type in "safety" and be presented with a table listing a count of how many individual communications include that key word. Once the user clicks on the key word, it is contemplated that a select number (e.g. the first 10) of electronic communications are presented to the user to select. As the user advances through the list, if the user sees a particular communication that the user would potentially like to add to the user's media kit, the user need only click on the electronic communication and can add it to one of the Frames in a virtual display presented on the user's computer screen. In one embodiment, the system may comprise an interface (e.g. a link in the form of a button positioned adjacent to each electronic communication) that can be clicked on to run or play the electronic communication. For example, if a user in going through the list of electronic communications associated with a particular key word, sees a particular electronic communication they would like to run, the user need only click on the button to run and view the content.

Still further, in yet another embodiment, another interface is provided wherein if the user determines that the a particular electronic communication should be added to the user's electronic media collection, the user need only click on the "add" button for the particular electronic communication to be added to the electronic media collection.

Once the user has added all the electronic communications desired related to the key word "safety", the user can look for content under another key word, such as "service." The user can follow the same process again and again to build a custom media kit using pre-assembled media data in a very quick and easy manner.

In still another embodiment, once the user has assembled all the various electronic communications into an electronic media collection the user has the option to view the various electronic For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or internetwork.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment a system for transmitting and displaying electronic media from a service provider to a subscriber is provided comprising, a controller having a storage with an electronic media collection stored thereon, and a display coupled to the controller, the display displaying the electronic media collection. The system is provided such that the display includes at least a first and a second frame where the first frame displays media data selected from the group consisting of: audio, video, text, images, animations, web pages, streaming media data and combinations thereof. The system further comprises, a service provider computer coupled to the controller via a network connection, and software executing on the service provider computer to present a web page that is used to log onto the system. The system still further includes an electronic media library accessible by the service provider computer, the electronic media library searchable by key word. The system is further provided such that when the electronic media library is searched by key word, a plurality of pre-assembled media content is presented associated with the key word and upon selecting one of the plurality of pre-assembled media content presented, the selected content is presented allowing a user to see the selected pre-assembled media content prior to the content being added to the electronic media collection. The system is still further provided such that the pre-assembled media content that is added to the electronic media collection is presented on said display.

In another advantageous embodiment a method for transmitting and displaying electronic media from a service provider to a subscriber is provided comprising the steps of, connecting a display to a controller having a storage, the controller having a network connection, the display including at least a first and a second frame where the first frame displays media data selected from the group consisting of: audio, video, text, images, animations, web pages, streaming media data and combinations thereof. The method further comprises the steps of, accessing a service provider computer having a web page interface, the service provider computer having access to an electronic media library, searching the electronic media library by means of a key word, wherein pre-assembled media content is associated with the key word, and displaying pre-assembled media content associated with the key word. The method still further comprises the steps of, selecting one of the pre-assembled media content presented, presenting the selected pre-assembled media content, and adding pre-assembled media content to an electronic media collection. Finally, the method comprises the steps of, transmitting the electronic media collection to the controller, saving the electronic media collection on the storage, and presenting the electronic media collection on the display.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
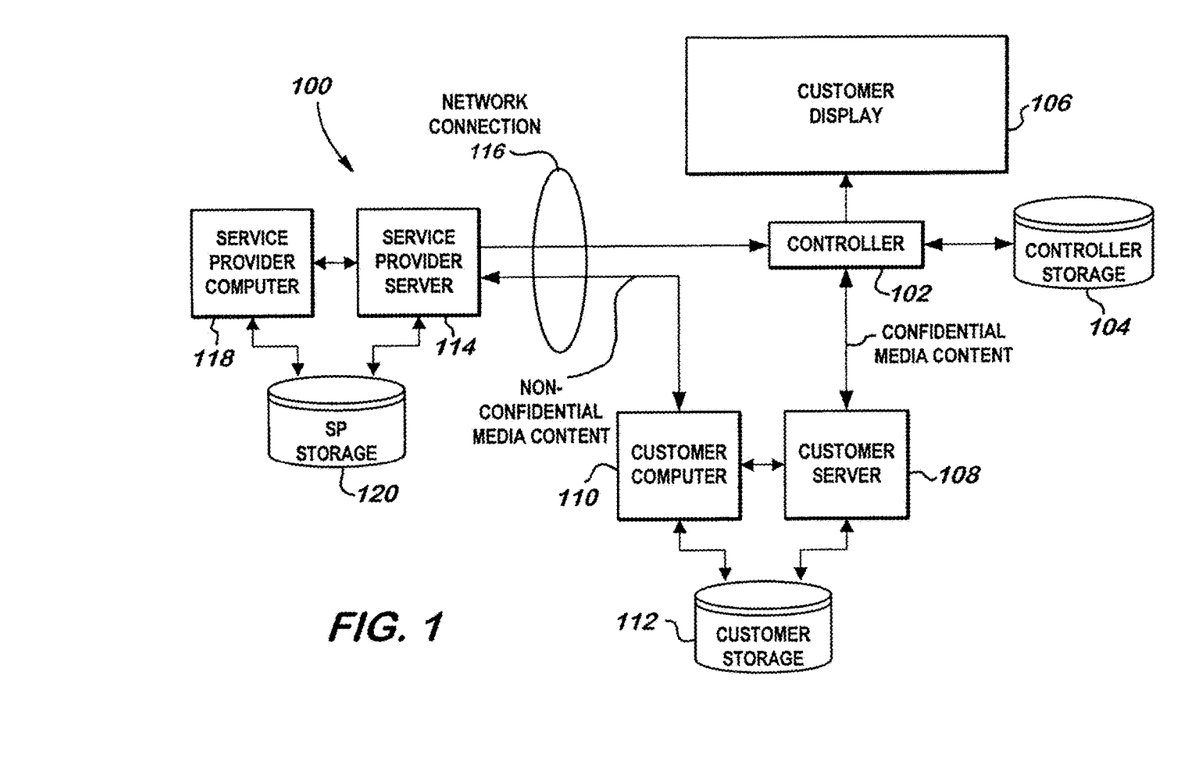
FIG. 1 is a block diagram of a system for implementing the present invention.

FIG. 1 is a block diagram of one advantageous embodiment of electronic media system 100. Electronic media system 100 is illustrated including a controller 102 having a controller storage 104, the controller 102 coupled to a customer display 106. Also illustrated in FIG. 1 is a customer server 108 and customer computer 110 coupled to a customer storage 112. Additionally, a service provider server 114 is shown variously coupled to controller 102 and to customer computer 110 via a network connection 116. A service provider computer 118 is further illustrated coupled to service provider storage 120 and service provider server 114.

Controller 102 may comprise any type of electronic programmable controller capable of receiving electronic data and transmitting the received data to a video display. In addition, the customer display 104 may comprise virtually any type of video display, however, in a preferred embodiment, customer display 104 comprises 26 inches (66 centimeters) in height and 63 inches (160 centimeters) in width and may comprise a flat panel video display. The controller 102 is coupled to service provider server 114 via network connection 116.

Figure 7:
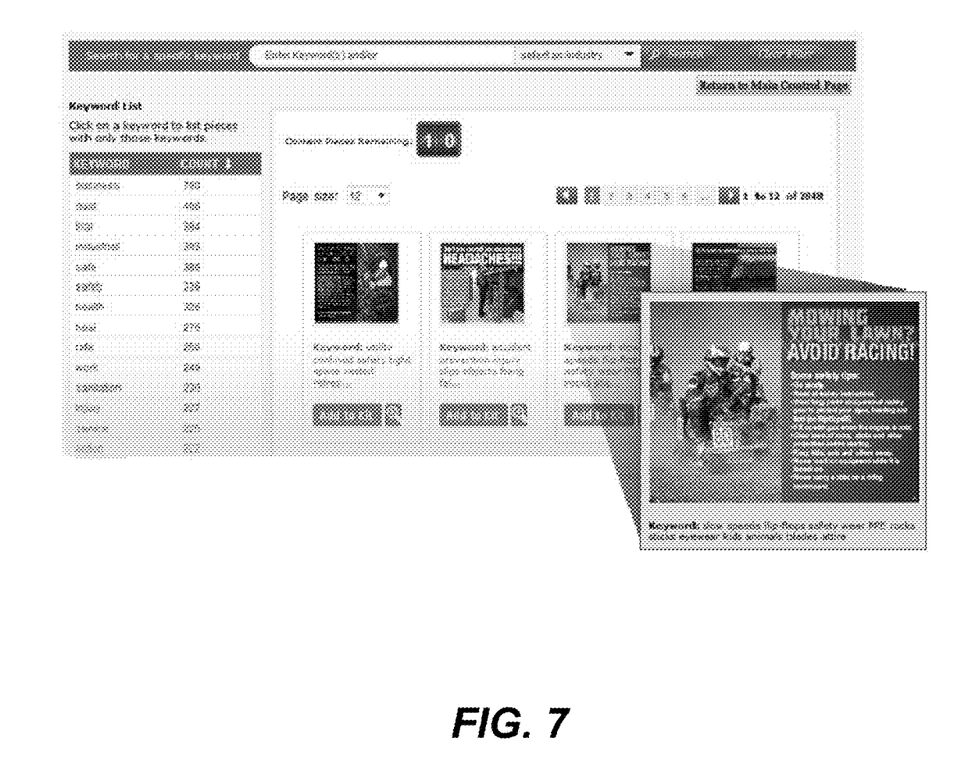
FIG. 7 is an illustration of a web page illustrating a media content library that is searchable via a key word.

A subscriber is able to access a variety of media content provided by the service provider to the subscriber. For example, the subscriber is provided with pre-assembled media content generated and provided by the service provider. This pre-assembled media content comprises media information the service provider has assembled and is believed would be of interest to the subscriber (FIG. 7). The service provider may, further suggest certain media content to the subscriber, which the subscriber may or may not select for display to its employees. In addition, the service provider may continually update the pre-assembled media content to provide fresh information to the subscriber so as to keep employees interested in the displayed information.

Also provided for the subscriber is the ability to modify the pre-assembled media content. For example, the subscriber may wish to present some of the pre-assembled media content to its employees with some minor changes particular, for instance, to the site location. The subscriber may select the pre-assembled media content and, by means of editing tools in the system software (FIG. 6), may modify the pre-assembled media content as desired. This may include, adding new content to the pre-assembled media content, deleting certain media content, rearranging the media content including altering the size, look and feel of the media content, altering the play time or play order for certain media content and so forth.

Still further, the subscriber may wish to generate entirely new media content completely unrelated to any of the pre-assembled media content. Again, the subscriber is provided with the tools to be able to compile virtually any information or data desired to be displayed on customer display 106.

Once the subscriber has viewed, modified and/or generated the media content to be displayed, the subscriber may compile an electronic media collection, which comprises all the information that the subscriber desires to be played on the customer display 106. The subscriber may further assemble the media content to play in a desired play order including selecting the length of time each segment of information will be displayed on the customer display 106.

The electronic media collection may be stored on service provider storage 120. In this manner, a subscriber may access and select certain pre-assembled media content and save an electronic media collection on service provider storage 120. In addition, the subscriber may access and modify certain pre-assembled media content and save the modified content in the electronic media collection. Still further, the subscriber may generate completely new media content, which may also be saved in the electronic media collection on service provider storage 120.

The electronic media system 100 therefore, advantageously provides for complete control of the media content to be played on customer display 106.

The subscriber may also set up the system to automatically update the electronic media collection with new pre-assembled media content as such becomes available. Alternatively, the subscriber may set the system up to provide the subscriber with a notification that new pre-assembled media content for the subscriber's review and authorization to play. Still further, the subscriber may set the system up such that the electronic media collection can only be updated manually.

In an advantageous embodiment, controller 102 queries service provider server 114 for an electronic media collection to be run on an associated customer display 106. It is contemplated that controller 102 may query service provider server 114 at a period time interval, such that the electronic tool collection is automatically updated.

Another advantage of the present embodiment is that, since controller 102 downloads the electronic media collection and stores it in controller storage 104, which may or may not be a cache memory location, upon severing of the network connection 116, the controller 102 can continue to play the electronic media collection on customer display 106 until the network connection 116 is re-established.

While FIG. 1 has been discussed in connection with only one customer display 106 location, it is contemplated that the subscriber may have many differing display locations, whether in the same complex or in many differing complexes. The subscriber is given maximum control of the media content provided to the various displays as described above.

Figure 2:
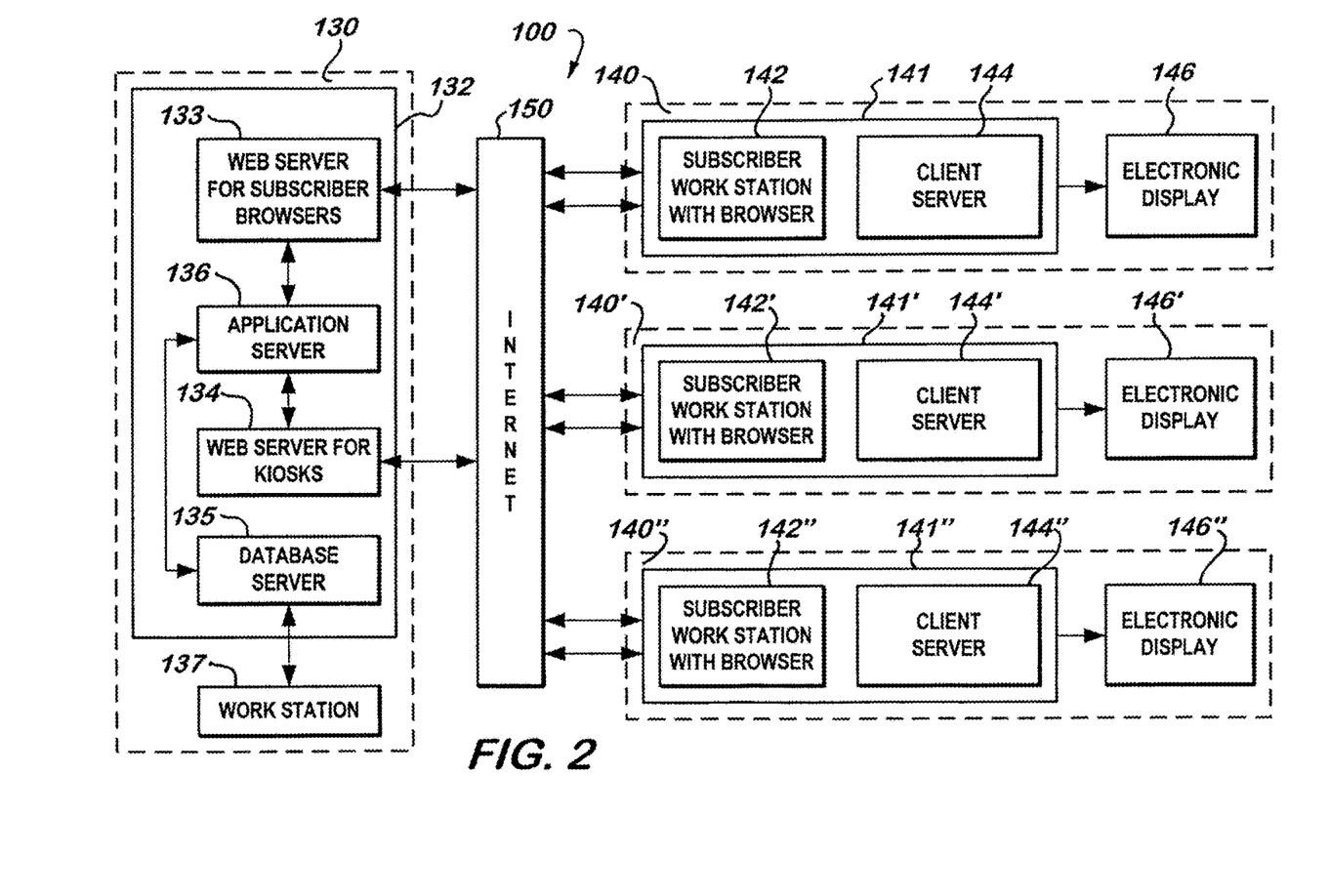
FIG. 2 is block diagram of an advantageous embodiment of the present invention.

Referring now to FIG. 2, the system for distribution of electronic media 100 facilitates electronic transmission of employee communications from a primary location to one or more remote subscriber locations. A typical media collection may include text and graphics arranged to be visually attractive and convey information pertinent to a subscriber's business, workplace or employees. The subject matter of the employee communications may involve safety, quality, teamwork, morale, self motivation, subscriber news releases, employee activities and the like.

The term "employee communication" as used herein is intended to include all forms of visual communication including graphics, written and printed text along with photographs, visual works and artistic material displayed either alone or in any combination. Particular employee communications may take the form of an electronic media collection or poster as described above and further include video and audio presentations.

The system for distribution of electronic media 100 comprises a main server system 130 located at a primary location and a multiplicity of client or subscriber communication and display systems 140, 140', 140" located at each remote subscriber location. The subscriber communication and display systems 140, 140', 140" communicate with the main server system 130 via, for example, an Internet connection 150, or other suitable communications pathway.

The main server system 130 comprises a computer 132 configured to function as a first web server 133, a second web server 134, a data base server 135, and an application server 136. While the main server system 130 is described in terms of several services and server functions, a single computer 132 may be configured to provide all functions and incorporate all described services being connected to the Internet connection 150. The first web server 133 is configured to be accessible by one or more subscriber work stations 142, 142', 142" to allow subscribers to modify the content of the employee communications.

The second web server 134 may be similar to web server 133 although modified to communicate via with one or more client servers 144, 144', 144". It will be understood that while two web servers 133 and 134 are provided, one web server performing both functions may be employed instead.

The database server 135 may be used to store subscriber information such as subscriber identification, business type, routing information and media data such as employee communication collections developed at a workstation 137 and as modified by the application server 136 as discussed below. Numerous workstations 137 may be employed. Each workstation 137 is configured so that a graphic designer may develop electronic employee communications (which may take the form of electronic media collections) and collect them together into employee communication collections which may contain, for example, collections of media collections and messages for a particular subscriber. The electronic employee communications are then sent to application server 136 where they are organized by edition and subscriber. The electronic employee communications are converted into an appropriate format for transmission over the Internet connection 150, and then stored before transfer to a client communication and display system 140, 140', 140".

The application server 136 communicates with both the first and second web servers 133, 134 and with the data base server 135. The application server 136 provides coordination between the web servers 133 and 134 and allows access to the electronic media collections contained in data base server 135. The application server 136 includes application software that tracks and distributes content according to subscriber data and as modified by subscribers according to the method of the present invention.

The client communication and display system 140, 140', 140" comprises a computer 141, 141', 141" respectively, that may include a client workstation 142, 142', 142", a client server 144, 144', 144", and an electronic display 146, 146', 146" (e.g. a flat panel display). The client workstation 142, 142', 142" communicates with the web server 133 via the Internet connection 150. The client work station 142, 142', 142" interactively communicates with web server 133 to transmit subscriber input, for example, to modify an employee communication collection and receive an updated version of the employee communication collection.

The client server 144, 144', 144" receives employee communication collections (alternatively referred to as electronic media collections) in the form of data in a particular format, for display on the electronic display 146, 146', 146". The client server 144, 144', 144" communicates with the web server 133 via the Internet connection 150. The client server 144, 144', 144" preferably comprises a web browser, which may be configured in a display mode whereby the browser receives data from the web server 133 and generates a continuous display. In particular, it will be understood that a number of channels of the web browser may be used to simultaneously display various elements of the employee communications collection for varying amounts of time.

Figure 5:
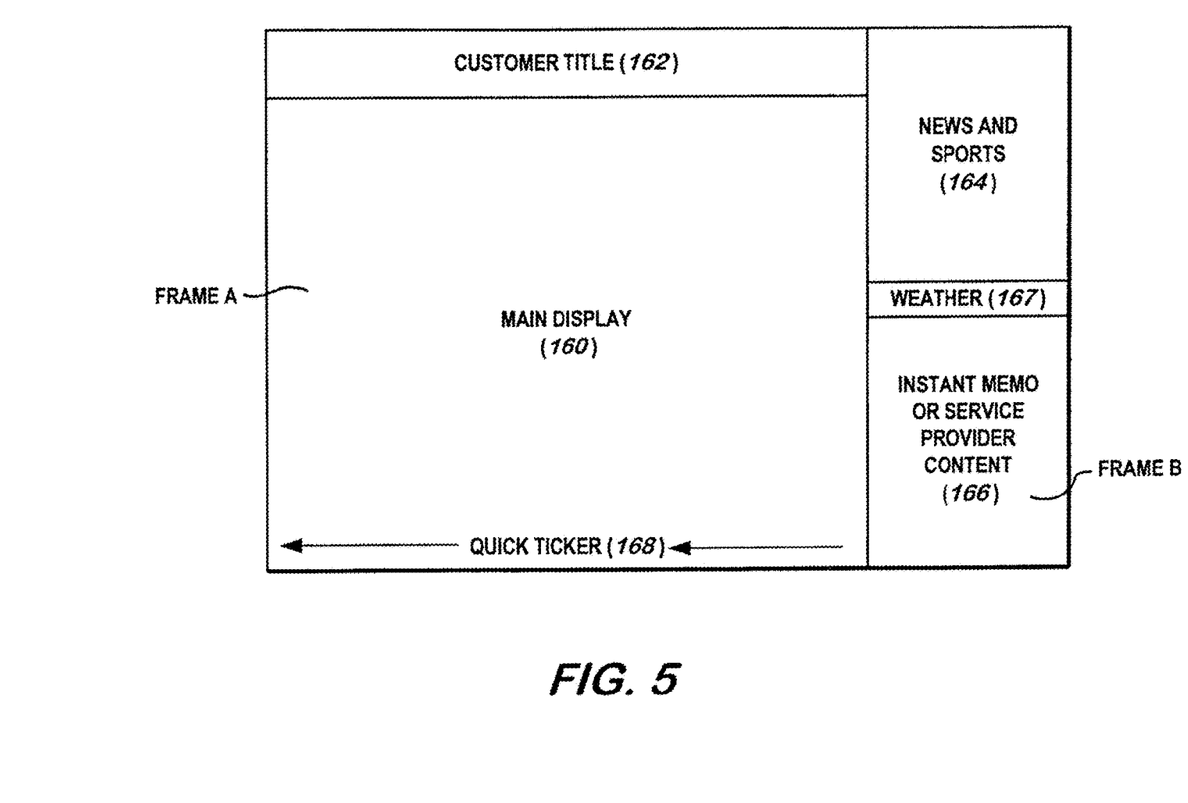
FIG. 5 is an annotated diagram of a representative electronic display according to FIGS. 1 and 2.

The client server 144, 144', 144" communicates employee communication collections (electronic media collections) to the electronic display 146, 146', 146" for display. Preferably, the electronic display 146, 146', 146" may comprise a plurality of sections for displaying different materials (FIG. 5). For example, as seen in FIG. 5, four separate sections 160, 162, 164 and 168 may be provided—each of which may be functioning simultaneously and at different update times and periods. Each section may sequentially display varying messages and/or visual media content, slogans, etc. For example, in section 160 (Frame A) audio/visual electronic media content may be played or shown for a specified time period, e.g. fifteen (15) minutes, and then switch to custom executive media content. Section 166 (Frame B) may display, concurrently with the employee communications displayed on section 160, an employee communication, then switch to alternate media content and so on. The relative timing may also be selected. For example, the messages may alternate every fifteen (15) minutes and may start seven and one half (7.5) minutes after the electronic media content is initially displayed in section 160. Section 164 may display news or announcements such as news headlines, sports scores and may be additionally split into a subsection 167 for display of local current and/or 3 or 5-day weather forecasts.

Figure 3:
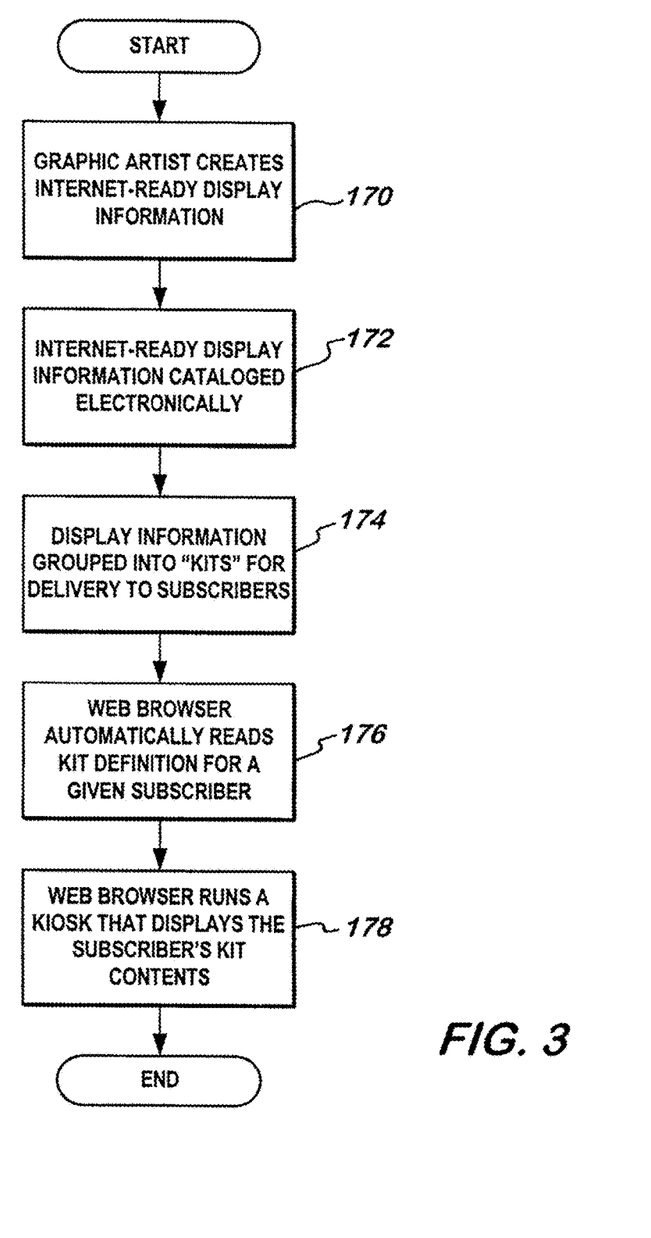
FIG. 3 is a partial flow diagram for a method of distributing electronic media according to the systems of FIG. 2.
Figure 4:
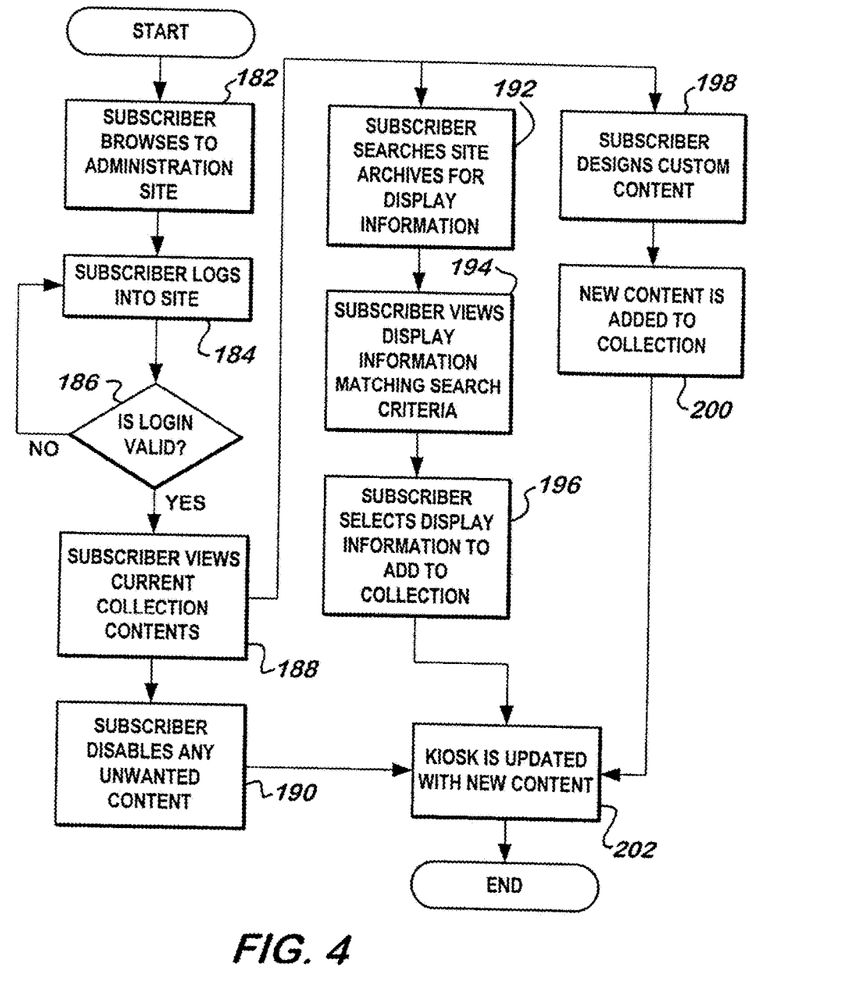
FIG. 4 is a partial flow diagram for a method of distributing electronic media according to the systems of FIGS. 1 and 2.

Operation. With reference to FIGS. 2, 3 and 4, a graphic artist using work station 137 creates an employee communication in electronic form that is compiled into an employee communications collection in a data format, as discussed above, that is suitable for transmission over the Internet as shown at 170 (FIG. 3). The electronic employee communications are cataloged and stored in the data base server 135 at 172 (FIG. 3).

The application server 136 and workstation 137 function to group electronic employee communications by topic and edition. The electronic employee communications may also be compiled into employee communications collections arranged by, for example, a particular subscriber or subscriber type such as retail or manufacturing subscribers at 174 (FIG. 3.) For example, the subscribers of systems 140 and 140' may have access only to one set of electronic media collections while the subscriber of system 140" has access only to a different set of electronic media collections. The application server 136 is also configured to indicate the last time and date that revisions or updates have been made to the employee communication collections.

Each subscriber may modify these collections using a subscriber workstation 142, 142', 142". The subscriber may select specific electronic employee communications (electronic media content) for display on the electronic display 146, 146', 146". Thereafter, the client server 144, 144', 144" communicates the electronic employee communications to the electronic display 146, 146', 146" at 176 (FIG. 3), as described above, for display at 178 (FIG. 3.).

The subscriber may also modify the contents of an employee communication collection. Using a subscriber workstation 142, 142', 142", the subscriber contacts the web server 133 (see, 182 and 184 of FIG. 4) and logs onto the web server 133. After checking for proper password and client ID at 186, the subscriber is allowed to view the current employee communication collection contents at 188. The subscriber may then choose between different options. The subscriber may search for electronic employee communications by topic, for example, electronic media content with themes such as safety, attitude, cooperation, etc. The subscriber may further remove any unwanted visual electronic media content or other content at 190. The subscriber may also search, using the application server 136, to select particular electronic media content or display information and add the selected media content to the employee communications collection at 192, 194 and 196. The subscriber may have access to various screens such as screen 250 (FIG. 6) to facilitate the search and selection. Optionally, the subscriber may design its own electronic media content within the application or simply provide electronic material for display, all of which may be added to the employee communications collection at 198 and 200. Once a subscriber has completed the modification, the application server 136 makes the updated employee communications collection available. Accordingly, when the client server 144, 144', 144" polls the web server 133, new media data is downloaded for display on the electronic display 146, 146', 146" as shown at 202 (FIG. 4.)

FIG. 7 depicts a web page illustrating a media content library that is searchable via a key word. For example, a user/subscriber may log on to service provider server 114 as previously discussed in connection with FIGS. 1 and 2. Once the user/subscriber has is logged in, the user has the option to access a media content library that is saved on storage 120.

The media content library is searchable via a key word search function as depicted, for example, on the left side of the screen. In one embodiment, the user/subscriber has the option to scroll through the various key words provided in the form of a list with an associated number count corresponding to the total number of discrete media pieces that are associated with the particular key word. Alternatively, the user/subscriber can simply type the key word in to the system as indicated at the top of the screen that the various media associated with the key word will be displayed.

It should be understood that the various media will be displayed on the screen for the user/subscriber to select from. In one embodiment the number of discrete media that will be displayed at one time is selectable. Further, as can be seen with reference to FIG. 7, a thumbnail for each discrete media piece may be presented to the user/subscriber where the system provides a first interface (labeled "Add to Kit") and a second interface (labeled with a magnifying glass).

The first interface allows the user/subscriber to add the particular pre-assembled media content to the user/subscriber's electronic media collection. The second interface (the magnifying glass), allows the user/subscriber to see an expanded view of the particular media content. In one advantageous embodiment, the particular media content expanded in the window as shown in FIG. 7, may run if it comprises video.

Figure 6:
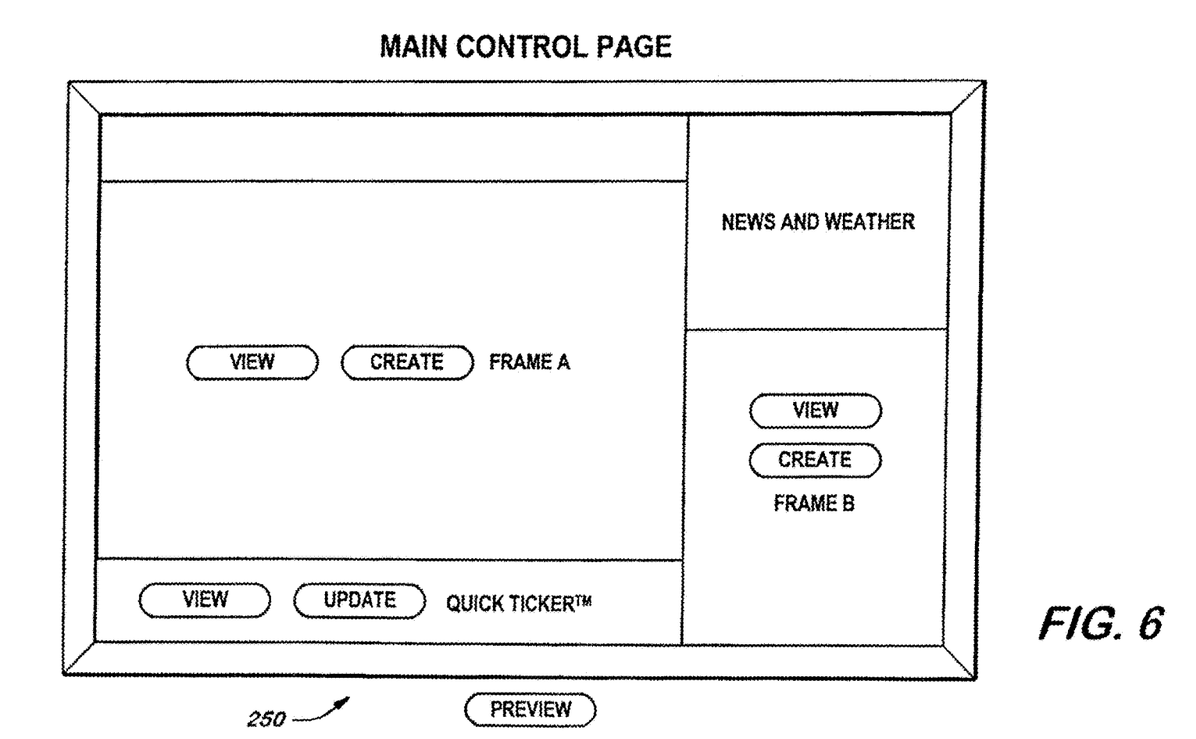
FIG. 6 is a representative screen generated by application software, which a subscriber may use in connection with the apparatus and method of FIGS. 1 and 2.

Once the user/subscriber has added all the pre-assembled media content to the user/subscriber's electronic media collection, the user/subscriber has the option to view the electronic media collection in a virtual display as illustrated in FIG. 6. For example, the various media content will be displayed on the virtual display allowing the user/subscriber to view, modify and edit the electronic media collection as desired. It may be that certain additional media content is desired, or that certain media content be removed, or that the duration that certain media content is displayed by adjusted.

It is further understood that the user/subscriber's key word search(es) may be saved by the system such that when additional or new media content is generated or becomes available that is associated with the key word search the user/subscriber performed, that a notification may be provided relating to the new content. For example, if the user/subscriber searched for the term "safety", the system may save the key word search term and when new content becomes available relating to "safety" a notification may be made available to inform the user/subscriber of the new content. The notification can be in the form of a message that is presented to the user/subscriber when they log on to the service provider computer 114. Alternatively, the notification could be in the form of an email or a text message that is delivered to the user/subscriber. When the user/subscriber logs back on to the system, the new media content may be presented, or certain key words presented in the list on the left side of the screen may be highlighted or be provided in a different color (e.g. green) indicating to the user/subscriber that new content is associated with the key word.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for transmitting and displaying electronic media from a service provider to a subscriber comprising:
    a service provider computer coupled to a controller of the sub scriber via a network connection;
    software executing on said service provider computer to present a web page that is used to log onto the system;
    an electronic media library accessible by said service provider computer, said electronic media library searchable by key word;
    wherein, prior to initiating a search from the subscriber via the web page, the electronic media library, via the software, displays an index of key words available for searching and a number count for each of the key words, the number count indicating the number of different media content associated with each of the respective key words;
    wherein, when the electronic media library is searched by a user-selected key word from the index, a plurality of pre-assembled media content associated with the key word is presented, and upon receiving a user-selected one of the plurality of pre-assembled media content presented, the selected content is presented allowing the sub scriber to view the selected pre-assembled media content prior to the content being added to the electronic media collection;
    wherein the pre-assembled media content that is added to the electronic media collection is configured for transmission to a display;
    wherein a value specifying a number of discrete media for presentment as a preview at one time and, both prior to selection of any of the plurality of pre-assembled media content and prior to being added to the electronic media collection as the plurality of pre-assembled media content, is selectable by the user via the web page.

2. The system according to claim 1, further comprising an interface associated with each of the plurality of pre-assembled media content, wherein when the interface is activated, the pre-assembled media content associated with the activated interface is added to the electronic media collection.

3. The system according to claim 2, wherein said interface comprises a first interface, said system further comprising a second interface associated with each of the plurality of pre-assembled media content, wherein when the second interface is activated, the pre-assembled media content associated with the activated second interface is presented allowing the subscriber to view the selected pre-assembled media content.

4. The system according to claim 1, wherein said software presents a virtual display to the subscriber, the virtual display mimicking said display.

5. The system according to claim 4, wherein the pre-assembled media content added to the electronic media collection runs on the virtual display.

6. The system of claim 5, wherein the pre-assembled media content added to the electronic media collection runs on user-selectable frames of the virtual display.

7. The system of claim 5, wherein electronic media collection is configurable by the subscriber via the virtual display, and a duration in which a subscriber-selected content item from the electronic media collection is displayed is adjustable.

8. The system according to claim 1, wherein the electronic media collection comprises: selected pre-assembled media content and pre assembled media content that has been modified according to subscriber-provided criteria.

9. The system according to claim 1, wherein the electronic media collection comprises: selected pre-assembled media content and custom generated media content generated for the subscriber.

10. The system according to claim 1, wherein the electronic media collection is transmitted to the subscriber.

11. The system according to claim 1, wherein the key word search of the subscriber is saved by the system such that when additional pre-assembled content related to the subscriber's saved key word search is available via the service provider computer, the system sends a notification to the subscriber of a new pre-assembled content;
wherein the additional pre-assembled content relating to the subscriber's saved key word search is highlighted to distinguish for the subscriber the additional pre-assembled content from pre-existing pre-assembled content.

12. The system according to claim 11, wherein the notification is presented to the subscriber when the subscriber logs in to the web page or the notification is sent to the subscriber via an email or text message.

13. The system of claim 1, further comprising an interface associated with each of the plurality of pre-assembled media content, wherein when the interface corresponding to one of the plurality of pre-assembled media content is activated, and the one of the plurality of pre-assembled media content is a video, the one of the plurality of pre-assembled media content is run at the display.

14. A method for transmitting and displaying electronic media from a service provider to a subscriber comprising:
providing, via a service provider computer, access to a web page that is used to log onto web page, the service provider computer communicatively coupled to a controller of the subscriber via a network connection, the service provider computer communicatively coupled to an electronic media library that is searchable by key word;
prior to initiating a search from the subscriber via the web page, displaying an index of key words available for searching and a number count for each of the key words, the number count indicating the number of different media content associated with each of the respective key words;
wherein when the electronic media library is searched by a user-selected key word from the index, presenting a plurality of pre-assembled media content associated with the selected key word, and upon receiving a user-selected one of the plurality of pre-assembled media content presented, presenting the selected content thereby allowing the subscriber to view the selected pre-assembled media content prior to the content being added to the electronic media collection; and
transmitting, to a display of the subscriber, the pre-assembled media content that is added to the electronic media collection;
wherein a value specifying a number of discrete media for presentment as a preview at one time, and both prior to selection of any of the plurality of pre-assembled media content and prior to being added to the electronic media collection as the plurality of pre-assembled media content, is selectable by the user via the web page.

15. The method according to claim 14, further comprising:
providing an interface associated with each of the plurality of pre-assembled media content; and
adding the pre-assembled media content associated with the interface to the electronic media collection when the interface is activated.

16. The method according to claim 15, wherein said interface comprises a first interface, said method further comprising:
providing a second interface associated with each of the plurality of pre-assembled media content; and
running the pre-assembled media content associated with the second interface when the second interface is activated.

17. The method according to claim 14, further comprising presenting a virtual display to the subscriber, the virtual display mimicking said display.

18. The method according to claim 17, wherein the pre-assembled media content added to the electronic media collection runs on the virtual display.

19. The method according to claim 14, further comprising: storing the the key word of the subscriber in a memory device of the service provider computer;
adding additional pre-assembled content to the service provider computer; and
notifying the subscriber when additional pre-assembled content related to the subscriber's saved key word search is available.

20. The method according to claim 19, further comprising presenting the notification to the subscriber when the subscriber logs in to the web page.

21. The method according to claim 19, further comprising sending the notification to the subscriber via an email or a text message.

* * * * *